United States Patent
Miceli

(10) Patent No.: US 10,383,306 B1
(45) Date of Patent: Aug. 20, 2019

(54) DISPOSABLE ANIMAL LITTER BOX WITH AN ATTACHED LID

(71) Applicant: Barbara Miceli, Woodstock, IL (US)

(72) Inventor: Barbara Miceli, Woodstock, IL (US)

( * ) Notice: Subject to any disclaimer, the term of this patent is extended or adjusted under 35 U.S.C. 154(b) by 310 days.

(21) Appl. No.: 15/216,478

(22) Filed: Jul. 21, 2016

(51) Int. Cl.
*A01K 29/00* (2006.01)
*A01K 1/01* (2006.01)

(52) U.S. Cl.
CPC .................... *A01K 1/0125* (2013.01)

(58) Field of Classification Search
CPC .................... A01K 1/0125; A01K 1/0107
See application file for complete search history.

(56) References Cited

U.S. PATENT DOCUMENTS

| | | | | |
|---|---|---|---|---|
| 3,154,052 A | * | 10/1964 | Sweeney | A01K 1/0125 119/168 |
| 3,233,588 A | * | 2/1966 | Thomas | A01K 1/0114 119/166 |
| 3,735,735 A | * | 5/1973 | Noroian | A01K 1/0107 119/165 |
| 4,541,360 A | | 9/1985 | Higgins et al. | |
| 4,627,382 A | | 12/1986 | Muzzey | |
| 4,716,853 A | | 1/1988 | d'Aniello | |
| 4,846,103 A | * | 7/1989 | Brown | A01K 1/0125 119/168 |
| 5,144,914 A | * | 9/1992 | Giannakopoulos | A01K 1/0107 119/168 |
| 5,251,573 A | | 10/1993 | Bremley | |
| 5,303,675 A | | 4/1994 | Van Den Bergh | |
| D372,565 S | * | 8/1996 | Rice | D30/161 |
| 5,832,869 A | * | 11/1998 | Franczak | A01K 1/0107 119/168 |
| D421,161 S | * | 2/2000 | Rogers | D30/161 |
| 6,065,429 A | * | 5/2000 | Crosse | A01K 1/0107 119/165 |
| D690,059 S | * | 9/2013 | Robbins | D30/161 |
| D692,192 S | * | 10/2013 | Graves | D30/161 |
| 8,578,886 B1 | | 11/2013 | Delisle | |
| 9,374,977 B2 | * | 6/2016 | Robbins | A01K 1/0114 |

(Continued)

FOREIGN PATENT DOCUMENTS

DE   10 2011 118 546 A1   1/2013
FR         89 04943       10/1990

(Continued)

*Primary Examiner* — Richard G Davis
(74) *Attorney, Agent, or Firm* — Brie A. Crawford; Crawford Intellectual Property Law LLC

(57) ABSTRACT

A disposable animal litter box with an attached lid is disclosed. In both a primary and secondary embodiment, the need to purchase litter, fill the box and change the litter is eliminated by this design. In the first embodiment, a foldable and moisture-resistant cardboard, paper, or composite structure is shown. The box is pre-filled with litter. The box has reinforced sides for durability during use. Once used, an integral lid is folded back and sealed in the closed position by threading the integral handle through a slit on the lid closure flap. In a second embodiment, wherein the box and lid are constructed of sturdy plastic material, the box is pre-filled with litter. The box has a lid that will snap into in a closed position to seal for transport and disposal and fold back during use.

5 Claims, 5 Drawing Sheets

(56) References Cited

U.S. PATENT DOCUMENTS

2009/0211531 A1* 8/2009 Lai ..................... A01K 1/0107
119/165
2010/0071628 A1* 3/2010 Wells ................. A01K 1/0107
119/169

FOREIGN PATENT DOCUMENTS

FR          02 13222     4/2004
WO    WO 03/039246 A1    5/2003

* cited by examiner

DISPOSABLE ANIMAL LITTER BOX WITH AN ATTACHED LID

BACKGROUND OF THE INVENTION

Many people live with companion animals. These companion animals bring much joy, but require care as well. One of the more unpleasant and cumbersome tasks of caring for a companion animal is changing a litter box. This is particularly true for cats, but can apply to other animals such as dogs, pigs, and ferrets.

A traditional litter box poses many problems. First, animal litter must be purchased at the store. Animal litter is usually sold in large containers that are heavy to lift. These containers can be hard to lift and transport home. Once at home, these containers have to be lifted again to fill the litter box. Due to the size and bulky nature, the animal litter can easily spill and cause a mess while filling the litter box. A litter box that eliminates the need to transport and lift bulky containers of animal litter is a useful invention.

Also, a litter box must be cleaned frequently. The animal litter must be dumped and changed. Traditional litter boxes are reusable. Animal urine and waste may contaminate the litter box as well as the litter. The reusable litter boxes must be washed and rinsed to remove the urine and waste or it poses a sanitary hazard and may cause unpleasant smells. A litter box that eliminates the need to empty the litter, wash the litter box, and refill the litter is a useful invention.

During cleaning, the reusable litter box must be lifted and the used animal litter transferred to a garbage bag or other trash receptacle. The litter box can be heavy especially when soaked with urine and waste. Also, the litter may clump and be hard to remove without force. Adding force can cause the urine and waste soaked animal litter to spill on the floor. A litter box that reduces or eliminates the risk of animal litter being spilled during cleaning is a useful invention.

Disposable animal litter boxes do exist. However, many of these boxes lack lids. For a disposable animal litter box to be user friendly, the used litter must be contained so the box can be disposed of quickly and easily. Also, the lid must be secure so that the used animal litter does not spill during transport or disposal. This is especially true during disposal when used animal litter or waste can clog the connection between the box and the lid which can cause spillage. A disposable animal litter box with an attached lid is a useful invention.

SUMMARY OF THE INVENTION

An objective of the present invention is the provision of a disposable animal litter box with an attached lid that has the litter pre-filled.

Another objective of the present invention is the provision of a disposable animal litter box with an attached lid that has a lid for easy opening and closing.

Moreover, an objective of the present invention is the provision of a disposable animal litter box with an attached lid that has a handle for easy transport and disposal.

Furthermore, another objective of the current invention is the provision of a first embodiment of a disposable animal litter box with an attached lid that has a lid that wraps around the handle for securely containing the used animal litter inside the box during disposal.

A still further objective of the current invention is the provision of a second embodiment of a disposable animal litter box with an attached lid that has a handle that wraps around the lid for convenient storage when the box is fully open during use.

Yet, another objective of the present invention is the provision of a disposable animal litter box with an attached lid which is lightweight and easy to transport.

Also, an objective of the present invention is the provision of a disposable animal litter box with an attached lid which securely seals the box after use and reduces the interference between the box and the lid due to used animal litter.

These and other objectives of the invention (which other objectives become clear by consideration of the specification, drawings, and claims as a whole) are met by providing a disposable animal litter box with an attached lid that is pre-filled with litter and which has the litter securely contained therein during transport or disposal.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
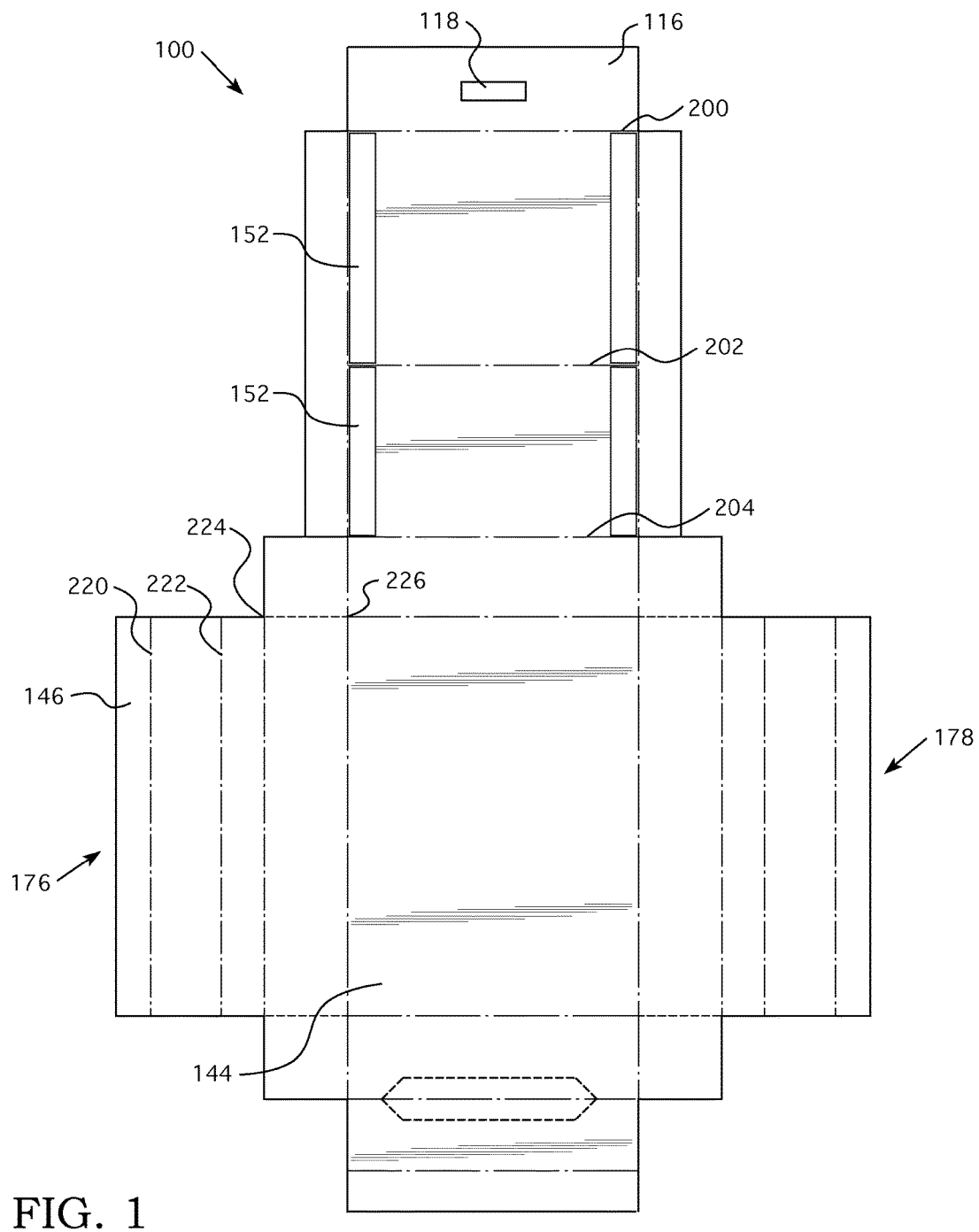
FIG. 1 depicts a top plan view of disposable animal litter box with an attached lid 100 shown unfolded, without litter 102, and with the fold lines 200, 202, 204, 220, 222, 224, and 226 depicted in dashed lines.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

Now adding FIG. 1, FIG. 2, FIG. 3, and FIG. 4 to the consideration, the structure and function of disposable animal litter box with an attached lid 100 can be clearly seen. Disposable animal litter box with an attached lid 100 is constructed of durable, moisture-resistant cardboard, paper, or composite material. Disposable animal litter box with an attached lid 100 has box 130 with pre-filled litter 102. Litter 102 is contained in box 130 through lid 110 and this connection is secured through the interaction of closure flap 116 and handle 150.

Moisture-resistance may be achieved by using a wax-coated or wax-saturated cardboard, paper, or composite material. The wax-coating or wax-saturation must cover at least the interior surfaces of box 130. However, the exterior surfaces of box 130 and the entirety of lid 110 may also be made of the wax-coated or wax-saturated material.

Moreover, moisture-resistance may be achieved by applying a spray on moisture resistant agent such as NeverWet® spray to the interior and potentially, the exterior surfaces of box 130 and lid 110. NeverWet® is a registered trademark, Registration Number 3,990,809, owned by NeverWet, LLC, a Limited Liability Company organized under the laws of the state of Pennsylvania, of 31 Industrial Circle, Lancaster, Pa. 17601.

The structure of box 130 can be clearly seen. Box 130 has left reinforced edge 176 and right reinforced edge 178 for added strength and support. Box 130 and lid 110 have a series of fold lines.

Lid 110 has lid fold lines 200, 202, and 204. Third lid fold line 204 allows the folding of lid 110 into fully closed position 180 over the top of box 130. First lid fold line 200 allows the folding of closure flap 116 over the front edge of box 130 into fully closed position 180.

Second lid fold line 202 may be folded backward against the portion of lid 110 between second lid fold line 202 and third lid fold line 204 to form the fully open position 182. Then, first fold line 200 can be backwardly folded underneath the bottom back edge 172 of box 130 to cause closure flap 116 to rest against the outside bottom of box 130. Fully open position 182 also creates a backboard to aid in deflecting kicked or scraped litter 102 back into box 130 and prevents litter 102 from exiting box 130 during use.

Left reinforced edge 176 and right reinforced edge 178 have reinforced sides. Reinforced edges 176 and 178 add strength and stability to disposable animal litter box with an attached lid 100 to allow for transport and disposal. Once disposable animal litter box with an attached lid 100 is used, the litter 102 is soaked with urine and other waste. Also, disposable animal litter box with an attached lid 100 may be kicked or scratched during use. Reinforced edges 176 and 178 aid to reduce damage or destruction to disposable animal litter box with an attached lid 100 during use and disposal.

Left reinforced edge 176 and right reinforced edge 178 have first edge fold lines 220, second edge fold lines 222, and third edge fold lines 224. Third edge fold lines 224 are folded inwardly and second edge fold lines 222 are folded inwardly and downwardly. First edge fold lines 220 are folded outwardly thereby creating securing flaps 146 that are anchored to the inside bottom 144 of the box 130. This creates left reinforced edge 176 and right reinforced edge 178.

A downwardly angled side wall is created when securing flaps 146 are secured directly against bottom edge fold line 226. This downward angle aids in deflecting kicked or scraped litter 102 during use, thereby keeping litter 102 inside of box 130.

Securing flaps 146 may be secured to the inside bottom 144 of box 130 through tape, glue, or any other suitable fastening mechanism and all such mechanisms are encompassed by this disclosure.

At the top of reinforced edges 176 and 178 is an optional adhesive strip 152 which is used to secure and seal lid 110 to box 130 prior to transport for disposal in order to create a sealed, fully closed position 180. Lid 110 may alternately be taped, glued, or attached with any other suitable fastening mechanism and all such mechanisms are encompassed by this disclosure.

Closure flap 116 extends over the front of box 130. Handle 150 is permanently attached to the front of box 130 and passes through centrally located slit 118 of closure flap 116 to aid in securing disposable animal litter box with an attached lid 100 in fully closed position 180 and closure flap 116 is used when disposable animal litter box with an attached lid 100 is being transported for setup or disposal. The insertion of handle 150 through slit 118 of closure flap 116 mechanically assures that box 130 remains closed when carried by handle 150 to prevent spillage of litter 102.

Figure 2:
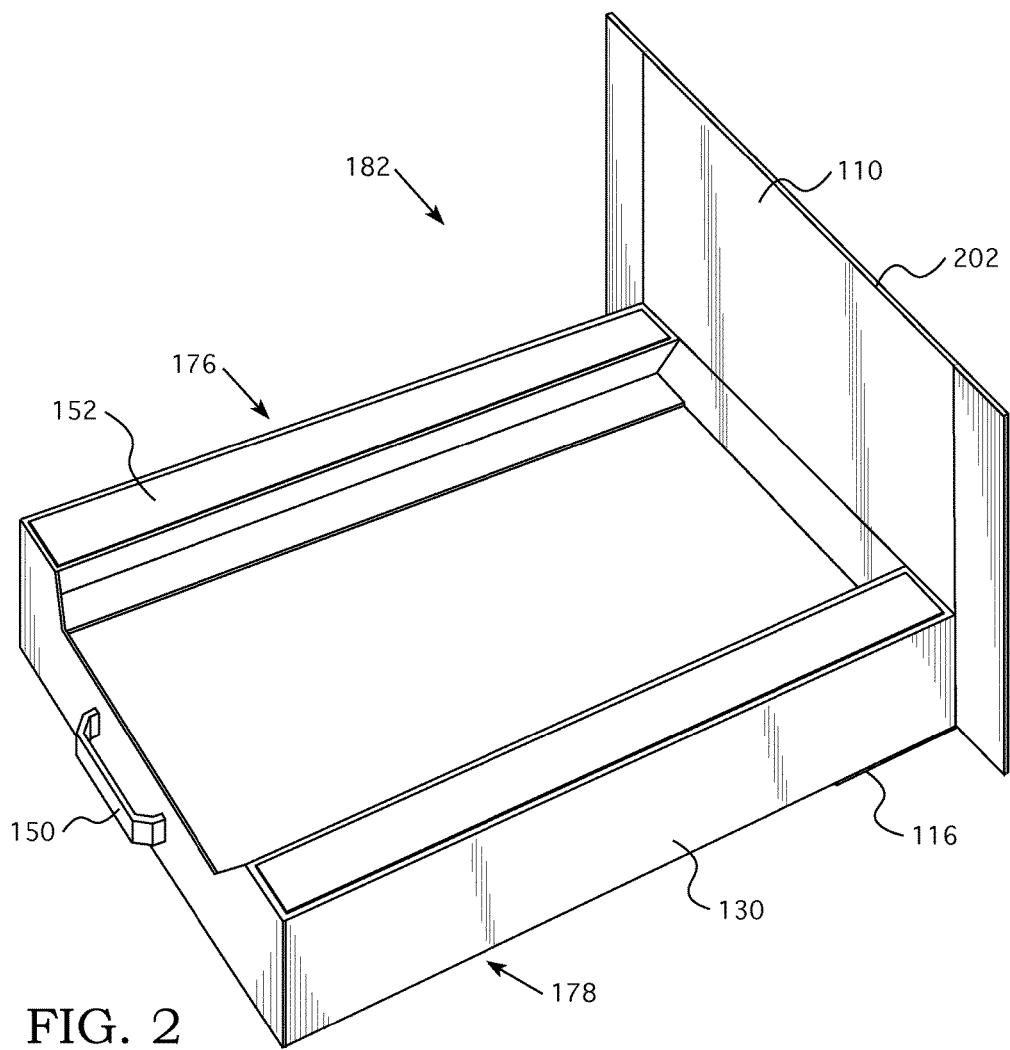
FIG. 2 depicts a top right perspective view of disposable animal litter box with an attached lid 100 shown with lid 110 in fully open position 182.
Figure 3:
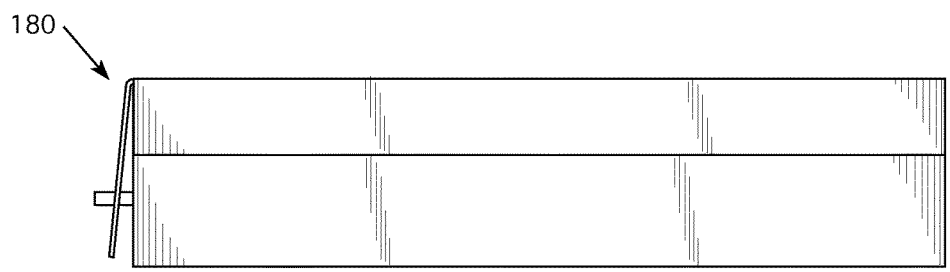
FIG. 3 depicts a right side plan view of disposable animal litter box with an attached lid 100 shown in closed position 180.
Figure 4:
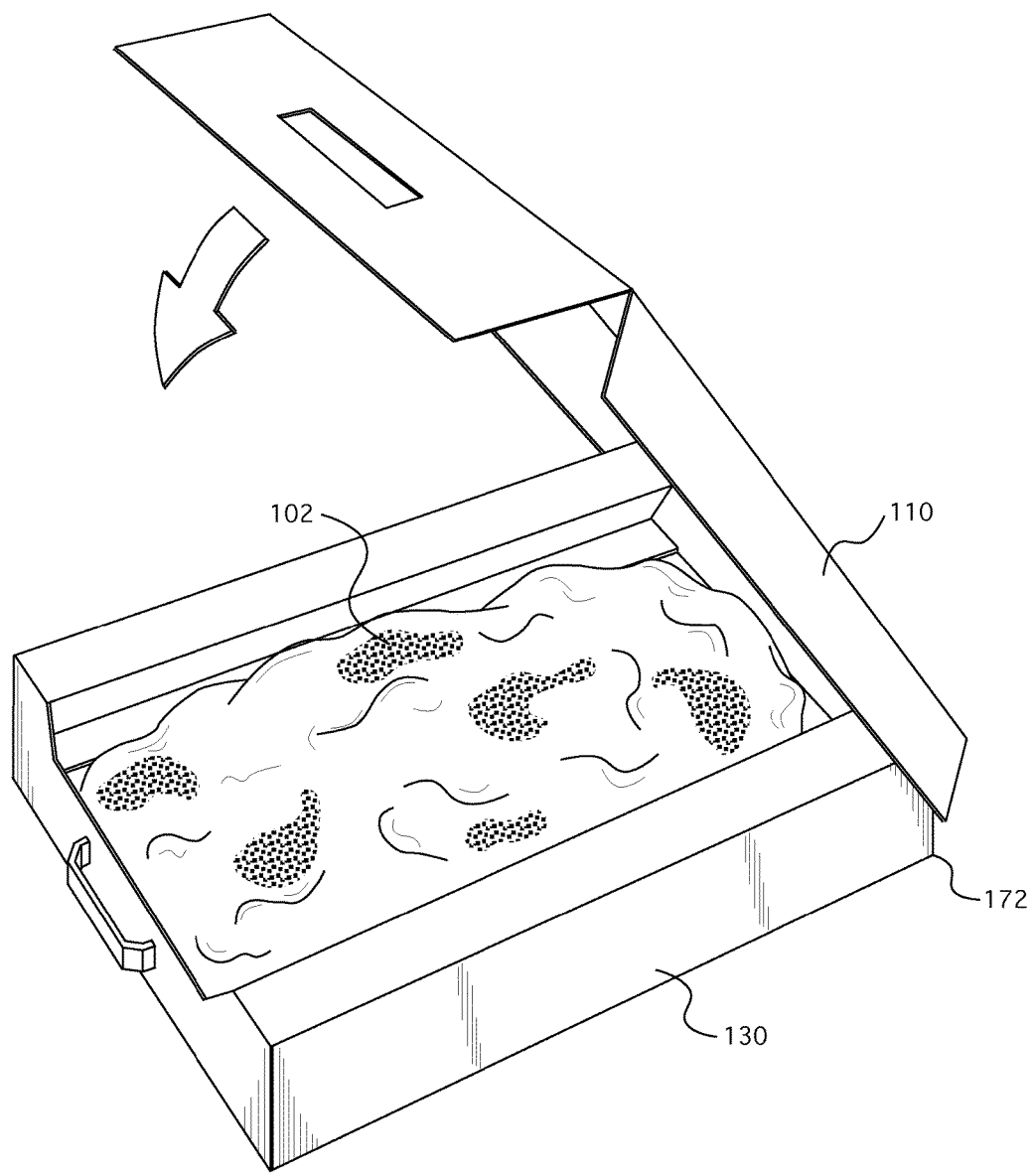
FIG. 4 depicts a top right perspective view of disposable animal litter box with an attached lid 100 shown with litter 102.

Left reinforced edge 176 and right reinforced edge 178 may have an optional full length adhesive strip 152 (See FIG. 2). Once litter 102 is used and disposal is desired, adhesive strips 152 are exposed by removing a protective film from the strips 152. Lid 110 is then folded over the top of the box 130 at third lid fold line 204 which brings lid 110 into contact with adhesive strips 152 which secure the lid 110 to the top of box 130. Closure flap 116 is then folded over the front of box 130 at first lid fold line 200 and handle 150 is passed through slit 118 to secure disposable animal litter box with an attached lid 100 in fully closed position 180 for disposal.

Or, optional adhesive strip 152 may be on the inside of lid 110 (See FIG. 1). If adhesive strip 152 is on the inside of lid 110, it must be divided into at least two adhesive strips 152 to account for the folding of lid 110 when in closed position 180 or fully open position 182. Adhesive strips 152 must not cross first fold line 200, second fold line 202, and third fold line 204.

Figure 5:
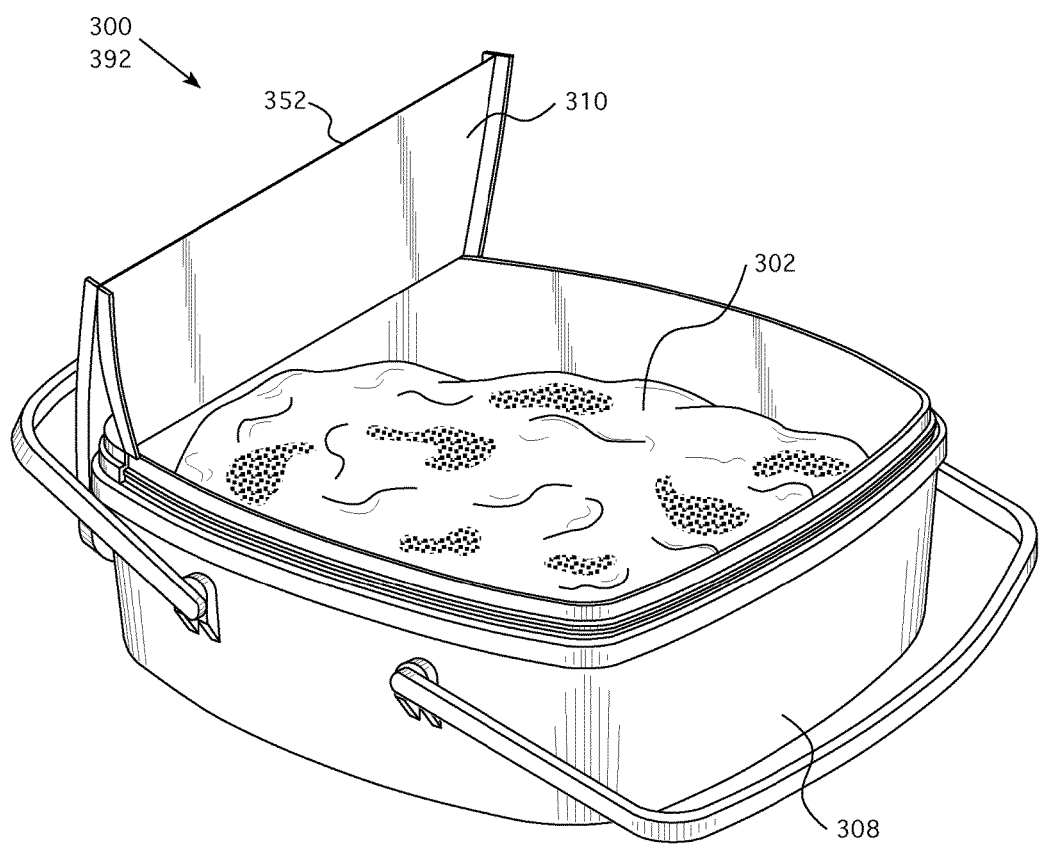
FIG. 5 depicts a top left perspective view of disposable plastic litter box with an attached lid 300 shown in fully open position 392.
Figure 6:
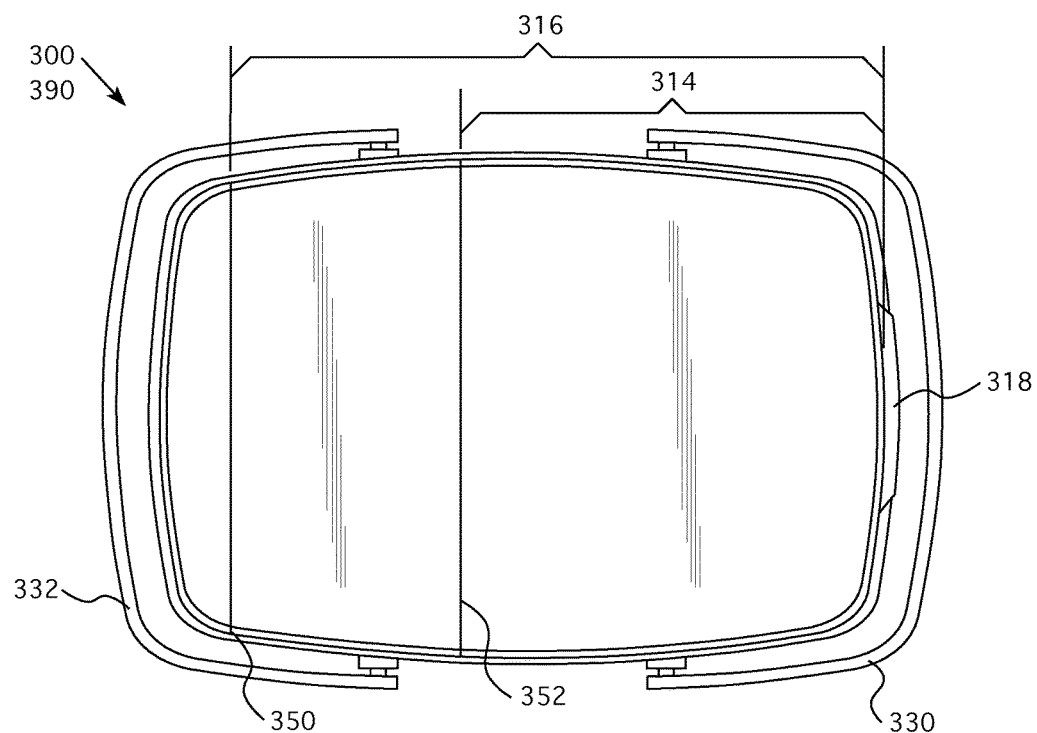
FIG. 6 depicts a top plan view of disposable plastic litter box with an attached lid 300 shown in closed position 390.
Figure 7:
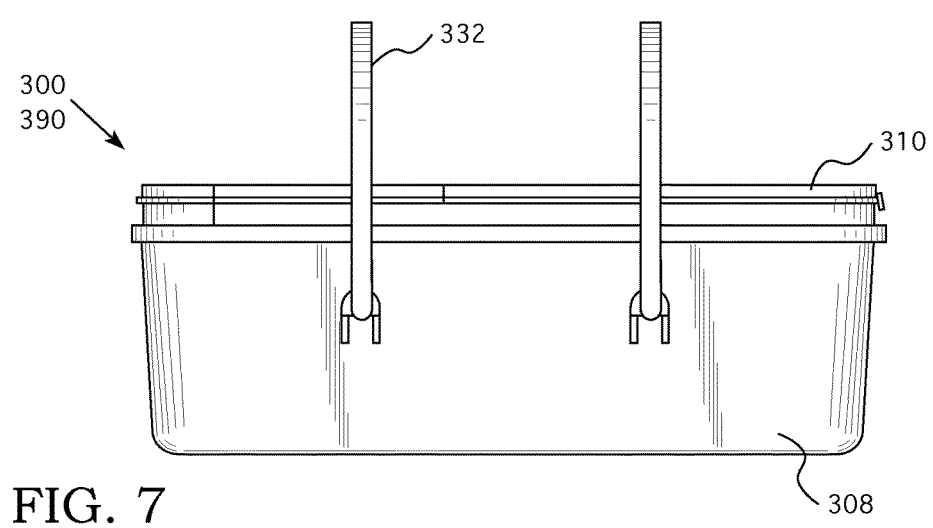
FIG. 7 depicts a left plan view of disposable plastic litter box with an attached lid 300 shown in closed position 390.

Now adding FIG. 5, FIG. 6, and FIG. 7 to the consideration, a second embodiment of disposable plastic animal litter box with an attached lid 300 can be clearly seen. Disposable plastic animal litter box with an attached lid 300 has a molded plastic box 308 with a hingedly attached lid 310. Disposable plastic animal litter box with an attached lid 300 is pre-filled with litter 302.

Lid 310 has closure flap 316 that is hingedly attached to lid 310. During transport for set up or disposal, closure flap 316 snaps down onto box 308 in a male to female relationship to form a closure seal that is water-tight, but releasable and creates closed position 390. At the front edge of closure flap 316, is a releasable snap locking mechanism comprised of closure tab 318. Closure tab 318 interacts with the closure seal on the front top edge of box 308.

Lid 310 has two fold lines 350 and 352 molded into it allowing for lid 310 to remain partially attached to box 308 by folding the closure flap 316 to be in fully open position 392 for use.

The first fold line 350 allows the closure flap 316 to be folded back toward the rear of box 308 and brings the second fold line 352 slightly past the rear of box 308. The second fold line 352 allows forward segment 314 to fold back over the second fold line 352 to be folded downward over the rear of box 308 creating the fully open position 392 that allows lid 310 to remain attached to box 308 while in use. Fully open position 392 also creates a backboard to aid in deflecting kicked or scraped litter 302 back into box 308 and prevents litter 102 from exiting box 130 during use.

Box 308 has forward handle 330 and rear handle 332 attached thereto. Forward handle 330 and rear handle 332 allow for balance of disposable plastic animal litter box with an attached lid 300 when carried during transport or disposal. When disposable plastic animal litter box with an attached lid 300 is in fully open position 392, forward handle 330 moves forward and around the front of box 308 and rear handle 332 is temporarily rotated approximately 180 degrees to the underside of box 308. Then lid 310 is folded to the fully open position 392. Rear handle 332 is then rotated to the rear of box 308 to encompass and hold lid 310 in the fully open position 392, as shown in FIG. 5. While two handles are shown, a single handle 330 or 332 can be utilized and such embodiments are encompassed by this disclosure.

While various embodiments and aspects of the present invention have been described above, it should be understood that they have been presented by way of example only, and not limitation. Thus, the breadth and scope of the present invention should not be limited by any of the above exemplary embodiments.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this apparatus and method can become clear to a person having ordinary skill in this particular art. Such modifications are clearly covered by this disclosure.

What is claimed and sought to be protected by Letters Patent of the United States is:

1. A disposable plastic animal litter box comprising:
   a) a box and an attached lid;
   b) the lid cooperating with the box to form a closed position for transport and a fully open position for use; and
   c) the fully open position of the lid providing a backboard to deflect kicked or scraped litter back into the box during use, wherein the backboard rests against the back of the box, but does not insert into the box.

2. The disposable plastic animal litter box of claim 1 further comprising:
   a) the box having at least one handle for use in transport; and
   b) the at least one handle encompassing the lid in the fully open position.

3. A disposable plastic animal litter box comprising:
   a) a box and an attached lid;
   b) the lid cooperating with the box to form a closed position for transport and a fully open position for use;
   c) a forward handle and a rear handle whereby the rear handle encompasses the lid in the fully open position,
   d) the lid having at least one lid fold line to form the closed position and the fully open position;
   e) the lid having a forward segment and a closure flap;
   f) the at least one fold line facilitating the folding of the lid toward the rear of the box, with the forward segment resting against the back of the box to form the fully open position;
   g) the fully open position providing a backboard to deflect kicked or scraped litter back into the box during use, thereby avoiding spillage of litter; and
   h) the lid having a closure tab which cooperates with the box to create the closed position.

4. A disposable plastic animal litter box comprising:
   a) a box and an attached lid;
   b) the lid cooperating with the box to form a closed position for transport and a fully open position for use;
   c) a forward handle and a rear handle whereby the rear handle encompasses the lid in the fully open position;
   d) the lid having at least two lid fold lines to form the closed position and the fully open position;
   e) the lid having a forward segment and a closure flap;
   f) the at least two fold lines facilitating the folding of the lid toward the rear of the box, with the forward segment resting against the back of the box to form the fully open position;
   g) the fully open position providing a backboard to deflect kicked or scraped litter back into the box during use, thereby avoiding spillage of litter; and
   h) the lid having a closure tab which cooperates with the box to create the closed position.

5. A disposable litter box system comprising:
   a) a box and an attached lid;
   b) wherein the box is pre-filled with litter;
   c) the lid cooperating with the box to form a closed position for transport and a fully open position for use;
   d) the box having at least one handle for use in transport;
   e) the lid having at least two lid fold lines to form the closed position and the fully open position;
   f) the lid having a forward segment and a closure flap;
   g) the at least two fold lines facilitating the folding of the lid toward the rear of the box, with the forward segment resting against the back of the box to form the fully open position;
   h) the fully open position providing a backboard to deflect kicked or scraped litter back into the box during use, thereby avoiding spillage of litter;
   i) the lid having a closure tab which cooperates with the box to create the closed position; and
   j) the at least one handle being a forward handle and a rear handle whereby the rear handle encompasses the lid in the fully open position.

\* \* \* \* \*